United States Patent
Lax et al.

(10) Patent No.: US 10,585,229 B1
(45) Date of Patent: Mar. 10, 2020

(54) LIGHTING SYSTEM WITH PARTICULAR SEALING ARRANGEMENT

(71) Applicant: Clear-vu Lighting LLC, Central Islip, NY (US)

(72) Inventors: Daniel A. Lax, Roslyn, NY (US); Agjah I. Libohova, East Setauket, NY (US); Timothy J. Keuning, Northport, NY (US)

(73) Assignee: Autronic Plastics, Inc., Central Islip, NY (US)

( * ) Notice: Subject to any disclaimer, the term of this patent is extended or adjusted under 35 U.S.C. 154(b) by 136 days.

(21) Appl. No.: 15/807,481

(22) Filed: Nov. 8, 2017

Related U.S. Application Data

(60) Provisional application No. 62/419,456, filed on Nov. 8, 2016.

(51) Int. Cl.
| | |
|---|---|
| *F21S 8/00* | (2006.01) |
| *F21V 8/00* | (2006.01) |
| *F21Y 103/10* | (2016.01) |
| *F21Y 115/10* | (2016.01) |

(52) U.S. Cl.
CPC ........... *G02B 6/0055* (2013.01); *F21S 8/033* (2013.01); *G02B 6/0051* (2013.01); *G02B 6/0088* (2013.01); *G02B 6/0091* (2013.01); *F21Y 2103/10* (2016.08); *F21Y 2115/10* (2016.08)

(58) Field of Classification Search
CPC ..... B60Q 3/62–66; H01L 33/483; F21K 9/61; F21V 31/005; F21V 17/16; F21V 17/162; F21V 15/013; G02B 6/0086; G02B 6/088; F21S 4/28; F21S 8/033; F21S 8/036–038; F21S 8/043; F21S 8/046; F21S 8/066
See application file for complete search history.

(56) References Cited

U.S. PATENT DOCUMENTS

| | | |
|---|---|---|
| 6,283,621 B1 | 9/2001 | Macri |
| 6,739,734 B1 | 5/2004 | Hulgan |
| 7,140,742 B2 | 11/2006 | Pohlert et al. |
| 7,922,354 B2 | 4/2011 | Everhart |
| 7,926,982 B2 | 4/2011 | Liu |
| 8,313,211 B2 | 11/2012 | Libohova et al. |
| 8,814,376 B2 | 8/2014 | Nicolai et al. |
| 9,316,370 B2 | 4/2016 | Lax et al. |
| 9,625,139 B2 | 4/2017 | Lax et al. |
| 2005/0174755 A1 | 8/2005 | Becker |
| 2007/0195527 A1 | 8/2007 | Russell |

(Continued)

OTHER PUBLICATIONS

Jul. 27, 2016 MTA NYCT Enhanced Station Initiative Program Design Criteria Manual; Contract A-36622A.
Jul. 26, 2016 Platform Component Details NCCT Contract A-36622A.

*Primary Examiner* — Anh T Mai
*Assistant Examiner* — Steven Y Horikoshi
(74) *Attorney, Agent, or Firm* — Zollinger & Burleson Ltd.

(57) ABSTRACT

Exemplary lighting systems, light fixtures, and wireways that can be used in a variety of public transportation or architectural applications are described. The light engines can be edge lit and sealed. The light engine includes an internal flange that engages a portion of the light diffuser assembly to force the light diffuser assembly against a seal to allow the light engine to be assembled with fasteners disposed at the top of the light engine. The wireways can include a common routing compartment disposed above a plurality of wiring channels.

19 Claims, 15 Drawing Sheets

(56) References Cited

U.S. PATENT DOCUMENTS

| | | |
|---|---|---|
| 2007/0247842 A1 | 10/2007 | Zampini et al. |
| 2007/0274084 A1 | 11/2007 | Kan et al. |
| 2008/0080162 A1 | 4/2008 | Wilcox et al. |
| 2008/0297701 A1 | 12/2008 | Lee et al. |
| 2011/0058358 A1 | 3/2011 | Soo et al. |
| 2014/0226072 A1* | 8/2014 | Ikuta .................... G02B 6/0081 348/725 |
| 2015/0330587 A1 | 11/2015 | Lax et al. |
| 2016/0102825 A1* | 4/2016 | Scribante ................ F21S 8/022 362/217.12 |

* cited by examiner

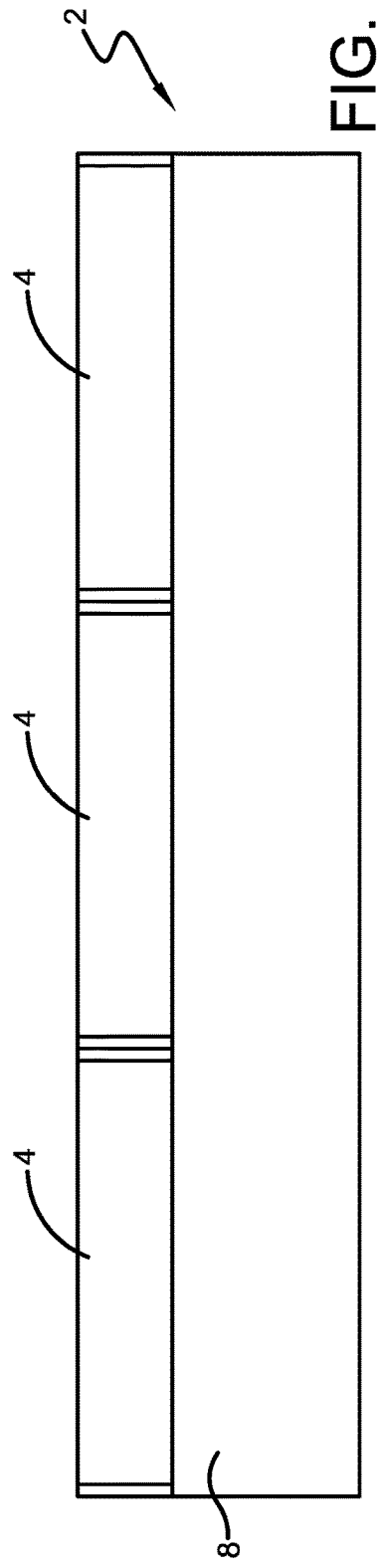
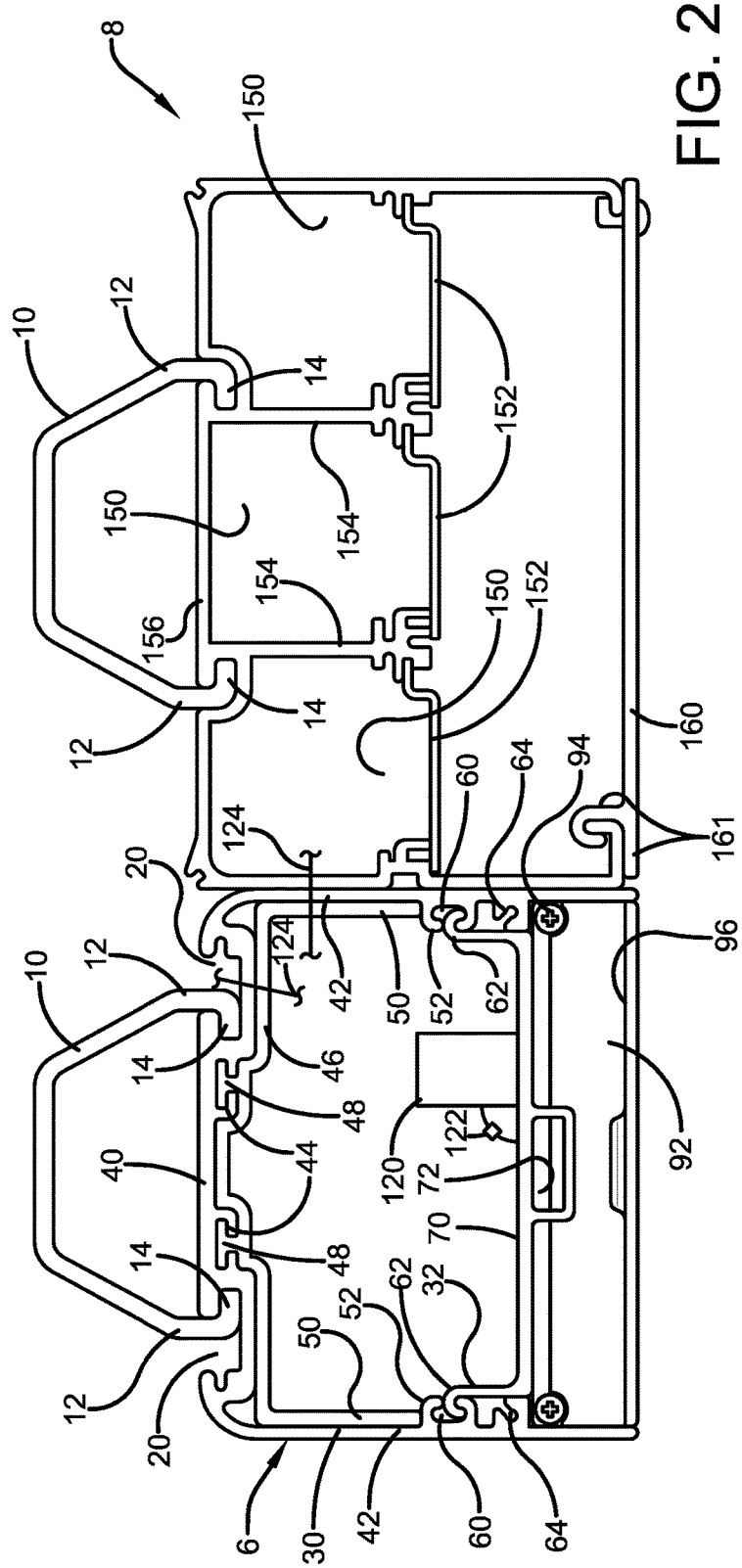

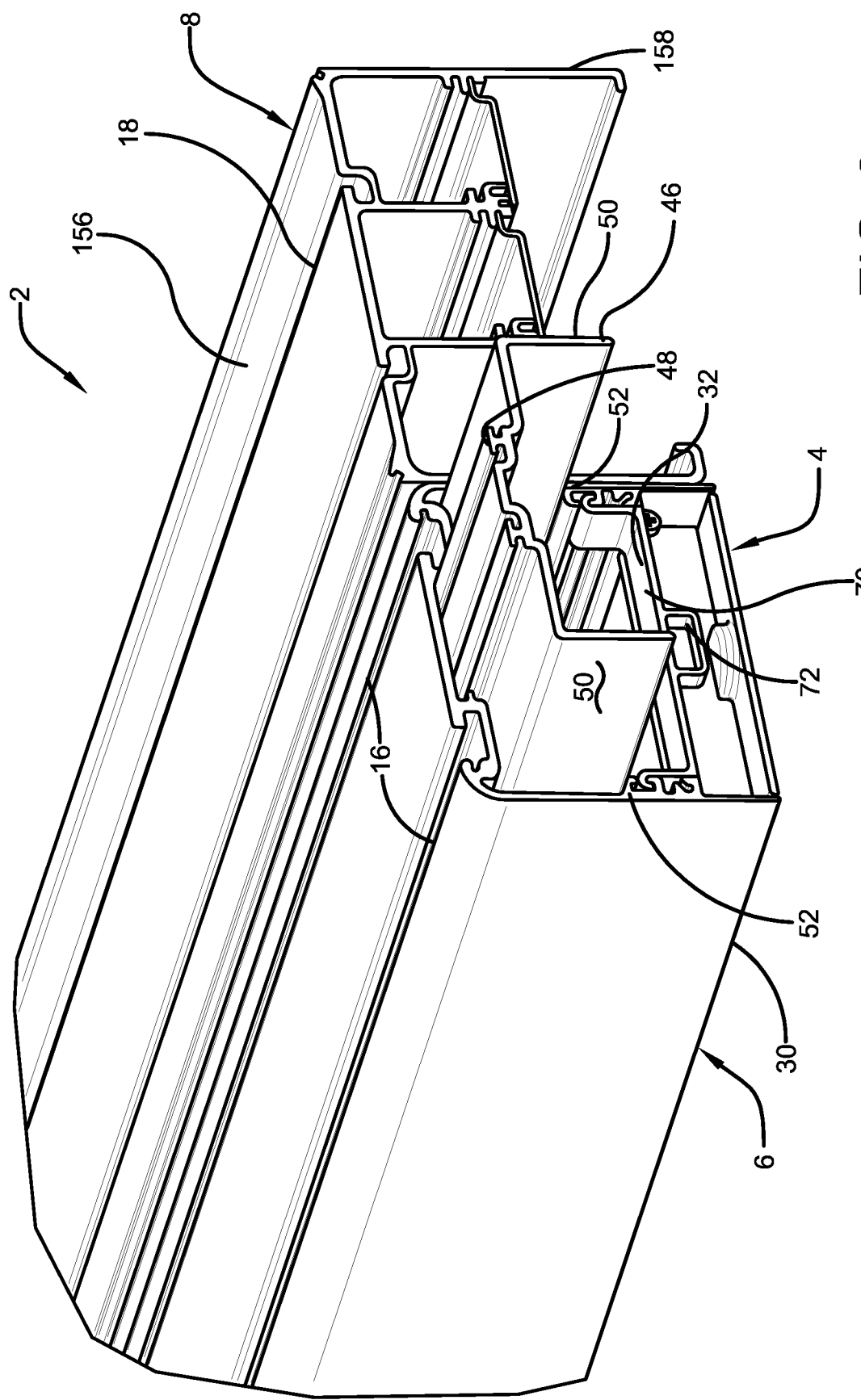

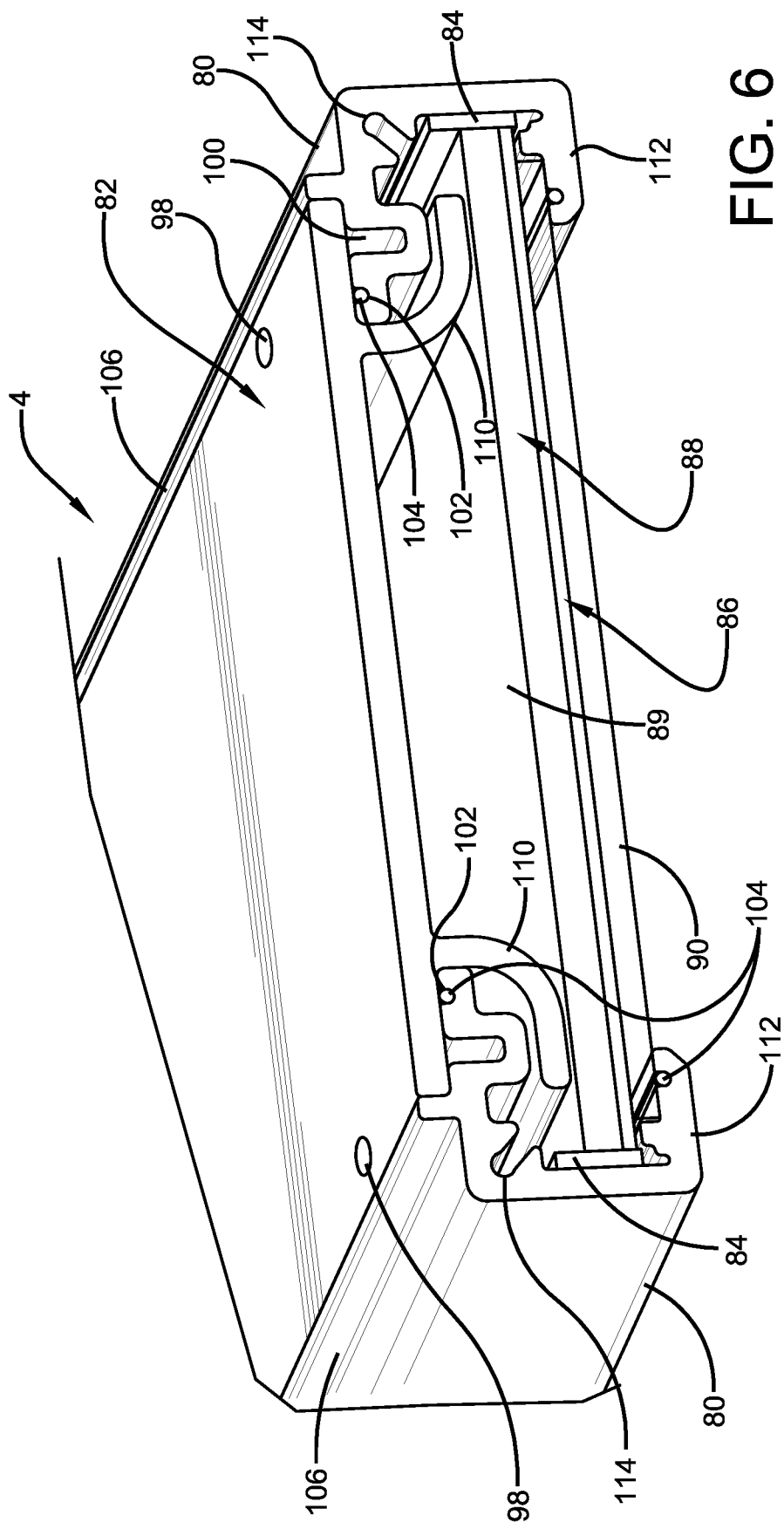

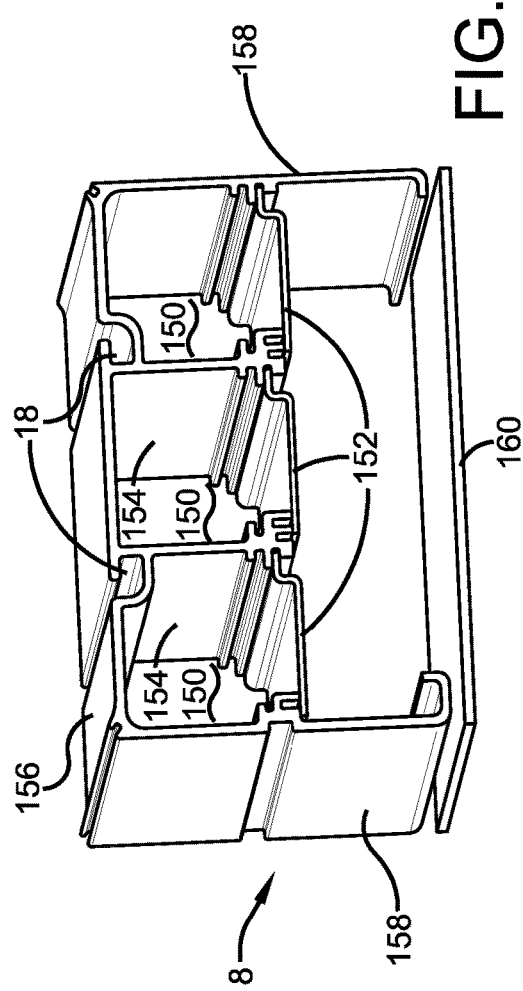
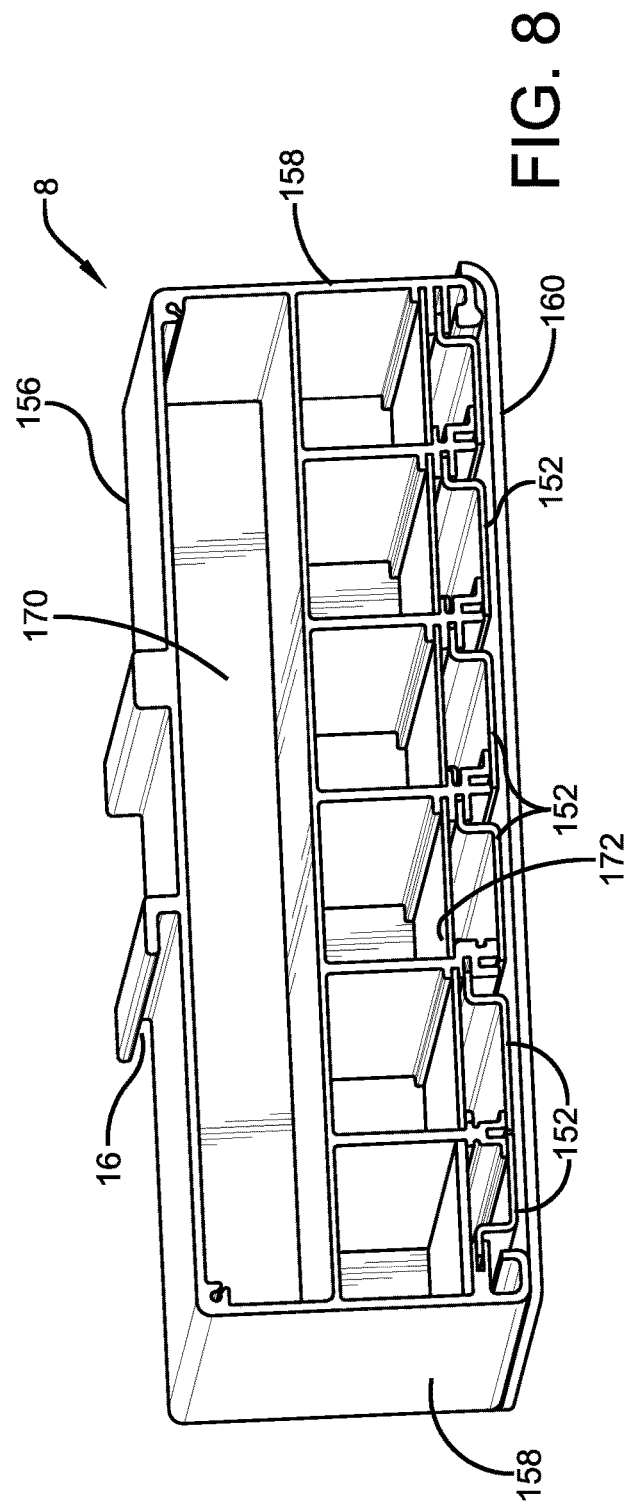

LIGHTING SYSTEM WITH PARTICULAR SEALING ARRANGEMENT

CROSS REFERENCE TO RELATED APPLICATIONS

This application claims the benefit of U.S. Provisional application No. 62/419,456 filed Nov. 8, 2016; the disclosures of which are incorporated herein by reference.

BACKGROUND OF THE DISCLOSURE

1. Technical Field

The disclosure relates to lighting systems and light fixtures and, more particularly, to a LED a light emitting diode (LED) lighting system having a low profile with sealed light engines carried by mounts and used in combination with wireways. The disclosure particularly relates to LED light fixtures configured for use in public transportation facilities where lighting failures are more critical than other facilities and wherein maintenance time and costs must be minimized.

2. Background Information

Many high traffic areas of public transportation facilities are located underground and require light fixtures that operate 24 hours per day, seven days per week, fifty-two weeks per year. These light fixtures must be reliable, easy to replace, and must be energy efficient. Traditional lighting in public transportation facilities requires bulb changes and typically only provides for a single type of power input. Replacement light fixtures that are easier to maintain and more power efficient are desired by the owners and operators of these facilities. Light fixtures that provide installation flexibility are also desired because the fixtures are often being retrofit into an existing location. Resistance to both liquids and humidity is also desirable for reliability. The systems disclosed below are intended to meet the design criteria set forth in the MTA NYCT Enhanced Station Initiative Program Contract A-36622A which is incorporated herein by reference.

SUMMARY OF THE DISCLOSURE

Exemplary lighting systems, light fixtures, and wireways that can be used in a variety of public transportation or architectural applications are described. The light engines can be edge lit and sealed. The wireways can include a common routing compartment disposed above a plurality of wiring channels.

BRIEF DESCRIPTION OF THE DRAWINGS

FIG. 1 is a plan view, depicted schematically, of a light fixture with three light engines disposed next to a wireway.

FIG. 2 is an end view of a light engine carried by a trough mounted from a hanger showing a trough coupler with a wireway disposed next to the trough.

FIG. 3 is a perspective view of FIG. 2.

FIG. 6 is a sectional perspective view of an edge-lit light engine.

FIG. 7 is a perspective view of a portion of the wireway of FIGS. 2 and 3.

FIG. 8 is a perspective view of an alternative configuration of a wireway with a routing compartment disposed above the individual wireway compartments.

Similar numbers refer to similar parts throughout the specification.

DETAILED DESCRIPTION OF THE DISCLOSURE

Figure 4:
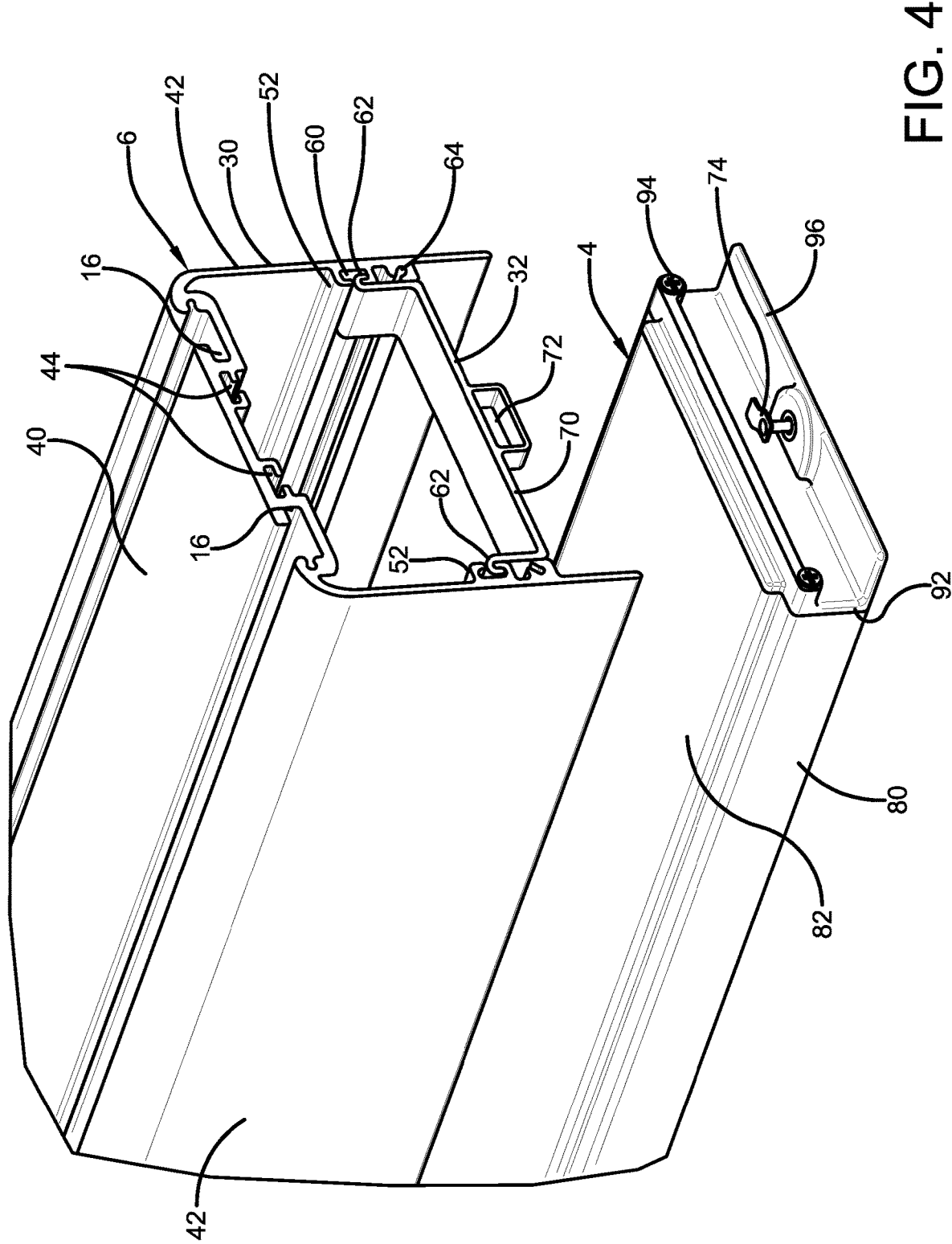
FIG. 4 is an exploded top perspective view of the trough, light engine hanger, and the light engine.
Figure 5:
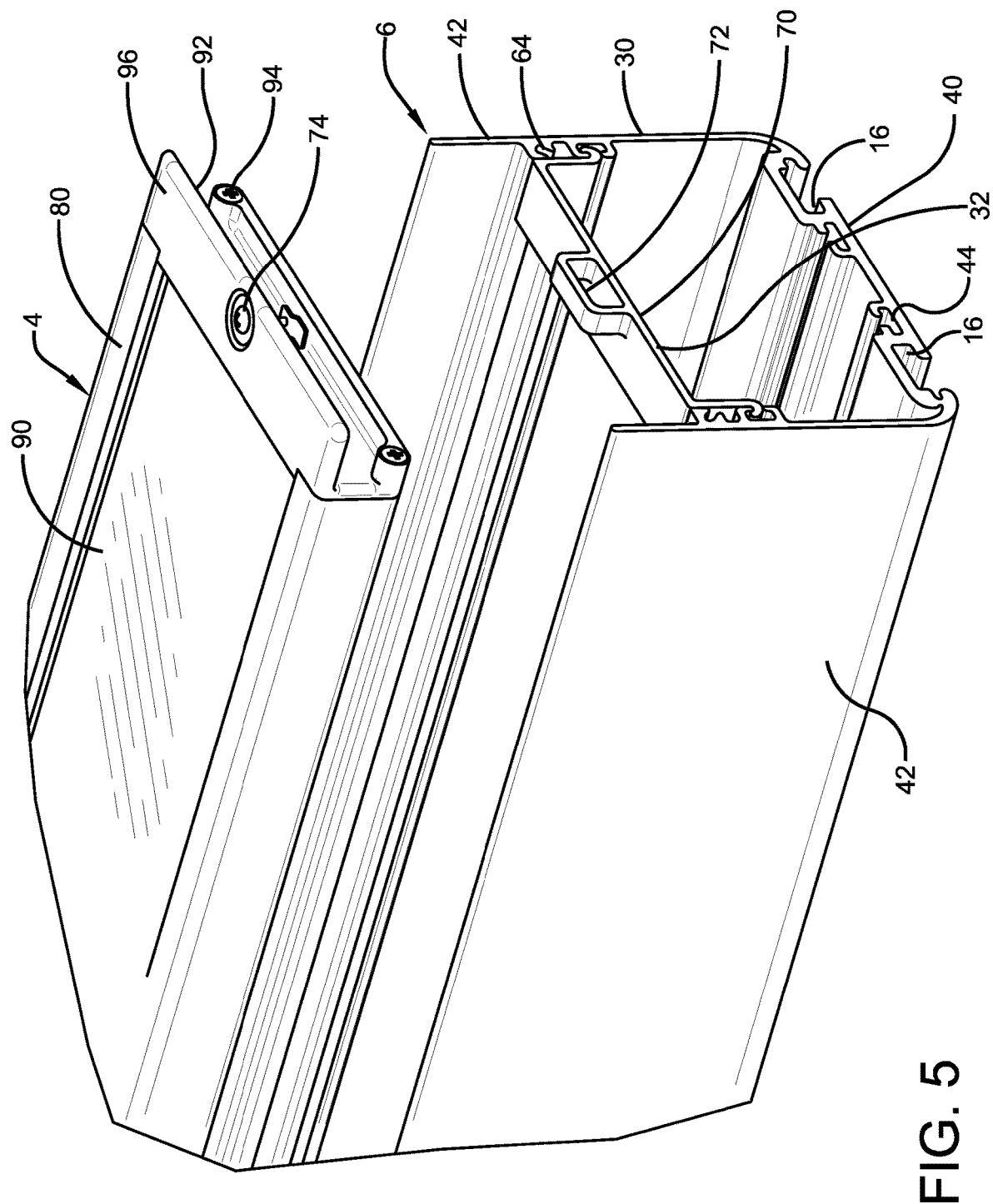
FIG. 5 is an exploded bottom perspective view of the trough, light engine hanger, and the light engine.

The following detailed description illustrates by way of example, not by way of limitation, the principles of the invention. This description will clearly enable one skilled in the art to make and use the invention, and describes several embodiments, adaptations, variations, alternatives and uses of the invention. It should be understood that the drawings are diagrammatic and schematic representations of exemplary embodiments of the invention, and are not limiting of the present invention nor are they necessarily drawn to scale.

The disclosure provides a lighting system 2, a light engine 4, a mounting assembly 6 for one or more light engines 4, and different configurations for wireways 8. These elements have new features taken alone and in combination with one another.

A first configuration of exemplary lighting system 2 is depicted in FIG. 1 and includes three light engines 4 carried by a single mounting assembly 6 disposed next to a wireway 8. Other configurations such as lighting systems 2 having a single light engine 4 to a plurality of light engines 4 such as six, nine, or twelve may be provided using the same components. In this configuration, each light engine 4 is about five feet in length with mounting assembly 6 and wireway 8 being about fifteen feet long. Optional end caps are used to close the ends. Other configurations wherein a plurality of light engines 4 are carried by a common mounting assembly 6 are provided by changing the length dimension of the components. In the exemplary configuration, the combined height of a light engine 4 and mounting assembly 6 is about four inches or less. This configuration provides a compact design that can fit within existing spaces currently used by existing lights so lighting system 2 can be retrofit into in existing facilities. In the exemplary configuration, each light engine 4 has a light aperture that is about 3⅝ inches wide and light engine 4 itself has a height that is 1¼ inch or less. Wireway 8 has a height that matches or is less than 10 percent greater than mounting assembly 6.

Mounting assembly 6 and wireway 8 are configured to be mounted to and carried by a hanger 10 (such as a clevice hanger). Hanger 10 can be secured directly to a structure or hung from a down rod. In the exemplary configuration, hanger 10 includes opposed arms 12 with inwardly extending, opposed fingers 14 that are received in hanger mounting channels 16 defined by mounting assembly 6 and hanger mounting channels 18 defined by wireway 8. As shown in FIGS. 2 and 8, hanger mounting channels 16 define open spaces 20 behind channels 16 so that hanger 10 can be stretched open and snapped into channels 16 or slid in from the ends of the component as desired. As also shown in FIG. 2, hanger mounting channels 18 can be configured to substantially match the shape of fingers 14 to lock fingers 14 in place after they are slid in from the end of wireway 8. Either style of hanger mounting channels 16 or 18 can be used with either component 6 or 8 as shown in FIG. 8.

Mounting assembly 6 includes a trough 30 and at least two light engine hangers 32. Trough 30 can be extruded and can be fabricated from a metal such as aluminum or a polymer. Trough 30 includes a top wall 40 and a pair of sidewalls 42. As described above, channels 16 or 18 are defined by top wall 40 and are open through the outer surface. Top wall 40 also defines coupler channels 44 open to the inner surface of trough 30 that slidingly receive a trough coupler 46 that is used to connect troughs 30 end-to-end. Trough coupler 46 includes fingers 48 that slide into coupler channels 44. Coupler 46 is held in place with friction, adhesive, or fasteners (inserted from the inside or the outside). In the exemplary configuration, fingers 48 are T-shaped. Trough coupler 46 is generally C-shaped and includes sidewalls 50 that engage the inner surfaces of sidewalls 42 of trough 30. FIG. 3 shows how trough coupler 46 extends from one trough 30 so that it is positioned to receive a second trough (not shown). Trough coupler 46 can be extruded and can be fabricated from a metal such as aluminum or a polymer. The lower ends of sidewalls 50 can engage protuberances 52 to provide a stable base for supporting the next trough.

Trough sidewalls 42 define channels 60 that receive mounting flanges 62 extending from the ends of light engine hangers 32. Protuberances 52 can define a portion of channels 60. In the exemplary configuration, flanges 62 are hook-shaped and allow light engine hangers 32 to be slid into place along trough. Each light engine hanger 32 can be fixed in place with friction, adhesive, tabs that extend from or through hanger 32, or fasteners. Slotted bosses 64 can be used to receive the fasteners that hold light engine hangers 32 in place. Sidewalls 42 extend down past the location of bosses 64 to define a pocket that receives light engine 4.

Each light engine hanger 32 includes a cross bar 70 that defines an opening 72 to which receives a fastener 74 that mounts light engine 4. Fastener 74 can be a quarter-turn fastener as shown in FIG. 4. Opening 72 can be defined by a U-shaped projection from cross bar 70. When quarter-turn fastener 74 is rotated to engage light engine 4, it can be configured to pull light engine 4 against the bottom of bosses 64 to provide a tight fit. Alternatively, as shown in the embodiment of FIGS. 14-17, at least one threaded fastener extends through an opening 75 in light engine 4 to engage a lock nut carried by cross bar 70 to secure light engine 4. The threaded fastener and lock nut combination resists vibrations. Seals such as polymer gaskets can be used at these locations.

After the length of system 2 is chosen and trough 30 is cut to length, the user connects two light engine hangers 32 for each light engine 4 at the locations where the ends of light engines 4 will be located. In another configuration, the light engine hangers 32 that are placed side-by-side where two light engines 4 abut can be provided as a single unit that accepts the tongues of two quarter-turn fasteners 74.

An exemplary light engine 4 includes sidewalls 80, a top plate 82, at least one LED light strip 84, a diffuser or diffuser assembly 86, and end caps 92. Top plate 82 can be aluminum or a polymer. Sidewalls 80 can be extruded from a metal such as aluminum or a polymer. Diffuser assembly 86 can include only a diffuser or a diffuser combined with one or more of a reflector 89, a light guide plate 88, and a cover 90. In the exemplary configuration, light engine 4 is an edge-lit unit that includes a light guide plate 88 with a reflector 89 disposed along its top so that all of the light is directed out the bottom of the diffuser. Light engine 4 can include a single LED light strip 84 or a pair of LED light strips 84 on either side of light guide plate 88. Each LED light strip 84 can include a plurality of LED light strip units arranged end-to-end with each carrying a plurality of LED circuits. In the edge lit configuration, each LED is closely positioned to, spaced by a spacer 91, or can directly contact the exposed edges of light guide plate 88 so that almost all the light generated by the LEDS is directed into light guide plate 88. Light guide plate 88 distributes the light and directs it to diffuser 86. Diffuser 86 can include an optional glass or polymer cover 90.

End caps 92 are fastened to the ends of sidewalls 80 with fasteners 94. A seal or gasket can be provided on the inner contact surface of each end cap 92 to seal the interior of light engine 4. Each end cap 92 defines a shelf 96 that supports quarter-turn fastener 74 or defines openings 75 that receive threaded fasteners that engage lock nuts. The configuration with the quarter-turn fasteners allows light engine 4 to be readily removed from mounting assembly 6. The configuration with the threaded fasteners and lock nuts provides a mounting configuration resistant to vibrations. If desired, each light engine 4 can be secured to the interior of mounting assembly 6 with a cable, chain, or hook that engages mounting rings 97 to prevent it from falling out when fasteners 74 are rotated. This cable, chain, or hook can then be detached to allow light engine 4 to be removed and replaced as needed. Each mounting ring 97 is pivotably carried by a mount secured through top plate 82 into sidewall 80 with a fastener 99 that is received in a fastener channel 100.

Top plate 82 is secured to sidewalls 80 with fasteners 98 that extend through top plate 82 into fastener channels 100 defined by upper inwardly-disposed projections of sidewalls 80. Inwardly (towards the middle of light engine 4) of fastener channels 100, each upper inwardly-disposed projection of sidewall 80 defines a seal recess 102 that receives a seal such as an O-ring seal 104 that is compressed when fasteners 98 are tightened to seal light engine 4. Each sidewall 80 also defines an upwardly projecting abutment wall 106 that contains top plate 82. Top plate 82 includes flanges 110 which project under the inwardly projecting portions of sidewalls 80 that define channels 100 and 102. These flanges function as compression features or compression members for the seals of light engine 4 which seals can be O-rings. Flanges 110 are sized to engage the inner (or upper) surface of the diffuser assembly such as against the top of light guide plate 88 (or reflector 89) (or flanges can resiliently push on light guide plate 88 or reflector 89) to force light guide plate 88, diffuser 86, and cover 90 against seals such as O-rings 104 carried by the upper surfaces of the lower inwardly-disposed projections 112 of sidewalls 80. Portions of flanges 110 can be disposed directly between fastener 98 and O-ring 104 carried by projection 112. O-rings 104 in combination with the gasketed end caps 92 seal the interior of light engine 4. This sealing configuration provides a waterproof seal to light engine 4. Sidewalls 80 define corner slots 114 that allow sidewalls 80 to have some resilience if desired to create the clamping force. Corner slots 114 also receive fasteners 115 that mount retainers 116 that hold LED light strip 84 in place. Flanges 110 are used to force the diffuser assembly down against the lower seals with only the force from fasteners 98 from the top of light engine 4. The light engine does not use fasteners that extend up from the bottom which allows projections 112 to be small to provide a wide opening for the distribution of light from light engine 4.

The power supply 120 for light engine 4 can be carried on top of light engine 4 within trough 30 or power supply 120 can be mounted from trough 30 by a bracket or directly fastened. One power supply 120 can supply power to a single light engine 4 or to a plurality of light engines 4. Power supply 120 can be connected to light engine 4 with an electrical connector 122 that provides a quick release and reconnect (IP65 quick connect plug or quick disconnect plug) to provide for easy removal and replacement. The power line can extend through top plate 82 or end cap 92 or sidewall 80 with a sealed configuration 118. Power supply 120 is powered by one or more electrical supply lines 124 that extend into trough 30 from wireway 8. The power supply line can extend through sidewall 42 or top wall 40. These lines can be in electrical conduits. Power supply 120 can be connected to the power supply line or power supply lines with a quick connect to allow for removal and replacement of power supply. Power supply 120 can be configured to accept power from different sourced at different voltages such as 110-220V and high power 600V. Power supply 120 also can accept battery power for emergency situations.

FIG. 2 depicts an exemplary wireway 8 that is disposed next to mounting assembly 6. The body of wireway 8 can be extruded metal such as aluminum or a polymer. This exemplary wireway 8 defines three wire channels 150 that are individually closed with access doors 152. Each door 152 is gasketed and can be hinged between open and closed conditions. A fastener such as a threaded fastener can be used to hold door 152 closed or a quarter-turn fastener can be used to hold door 152 closed. Each wire channel 150 is configured to receive wires or cables as needed which can be power lines or communication lines. One wire channel can be used for normal power, one for reserve power, and one for communications and or battery backup power. The lines can extend through the divider walls 154 or through the top wall 156 of the body of wireway 8. These can be disposed in conduit with seals used through the walls. The sidewalls 158 of the body extend down to the same level as mounting assembly 6. A cover plate 160 is provided to close wireway 8. Cover plate 160 can be hinged 161 between open and closed conditions.

Figure 9:
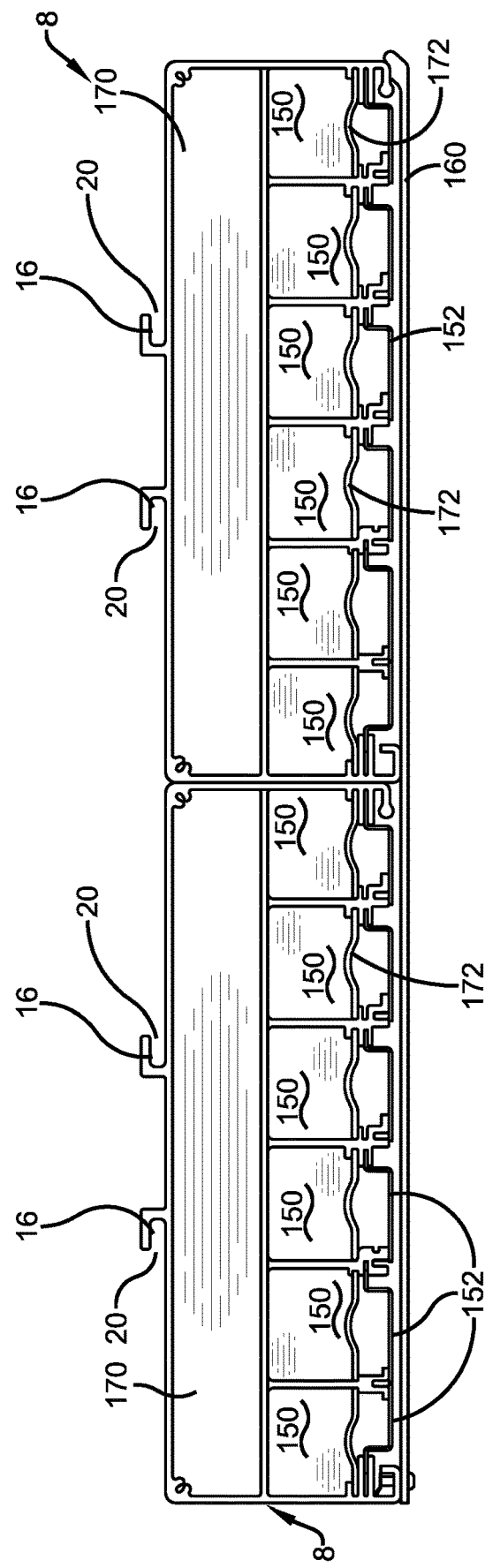
FIG. 9 is an end view of a pair of the wireways from FIG. 8 disposed side-by-side to double the number of wireway compartments and closed with a common access panel.
Figure 10:
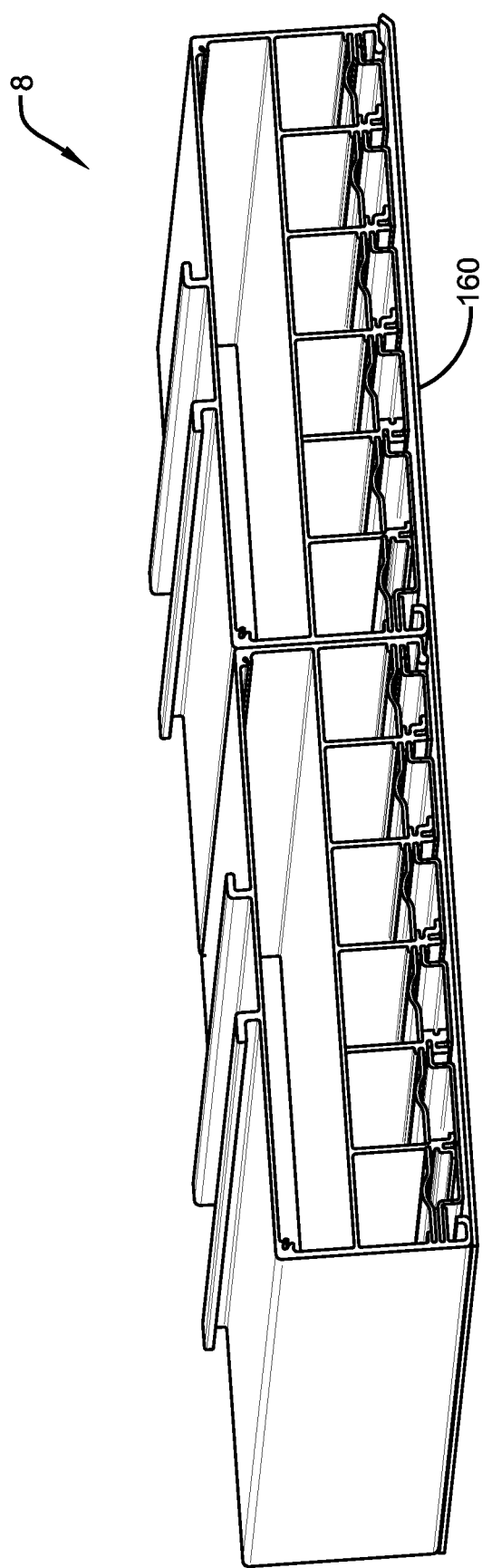
FIG. 10 is a perspective view of the end of the pair of wireways depicted in FIG. 9.

An alternative configuration is depicted in FIG. 8 wherein a routing compartment 170 is defined by the body of wireway 8 above wire channels 150. Compartment 170 can be used for the leads that extend from wireway 8 into mounting assembly 6. This has the advantage that the wires do not have to extend above system 2 where they are exposed to view and create sealing risks and require conduit. The wires can extend through the side of routing compartment 170 into trough 30 through a sealed conduit. This configuration provides six wire channels below routing compartment 170. This configuration has the same height as the configuration of FIG. 7 by moving channels 150 and doors 152 down. Cover plate 160 can be used to close the entire unit and provide a desirable exterior appearance to wireway 8. Supports 172 can extend across channels 150 to support the wires within and prevent them from falling down when doors 152 are opened. FIGS. 9 and 10 depict a pair of the FIG. 8 wireway 8 configurations disposed side-by-side with a common cover plate 160. Each of these wireway configurations 8 is closed by an end cap.

Figure 11:
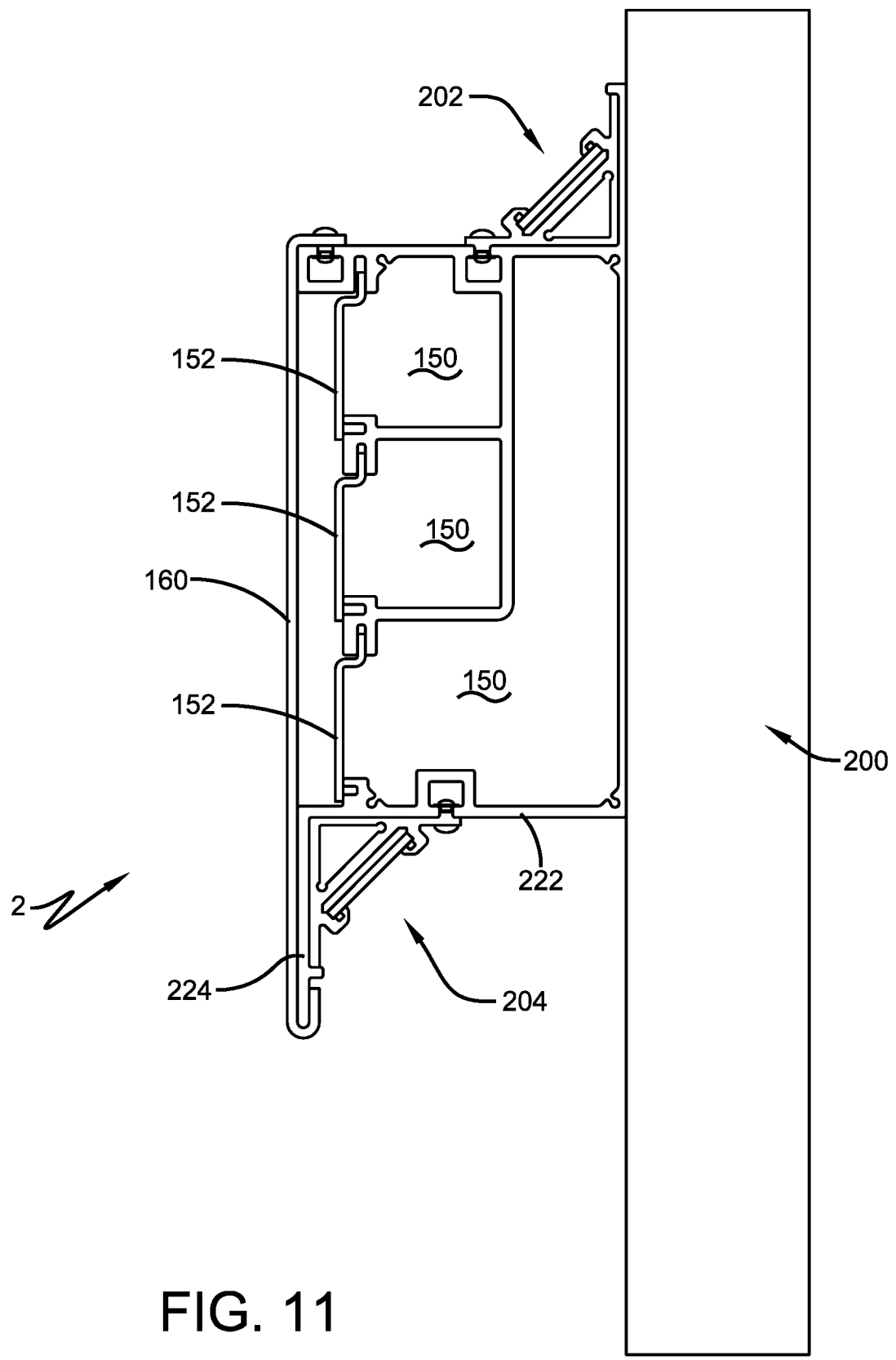
FIG. 11 is an end view of a lighting system configuration that is configured to be mounted to a vertical wall to provide up lighting, down lighting, or both.
Figure 12:
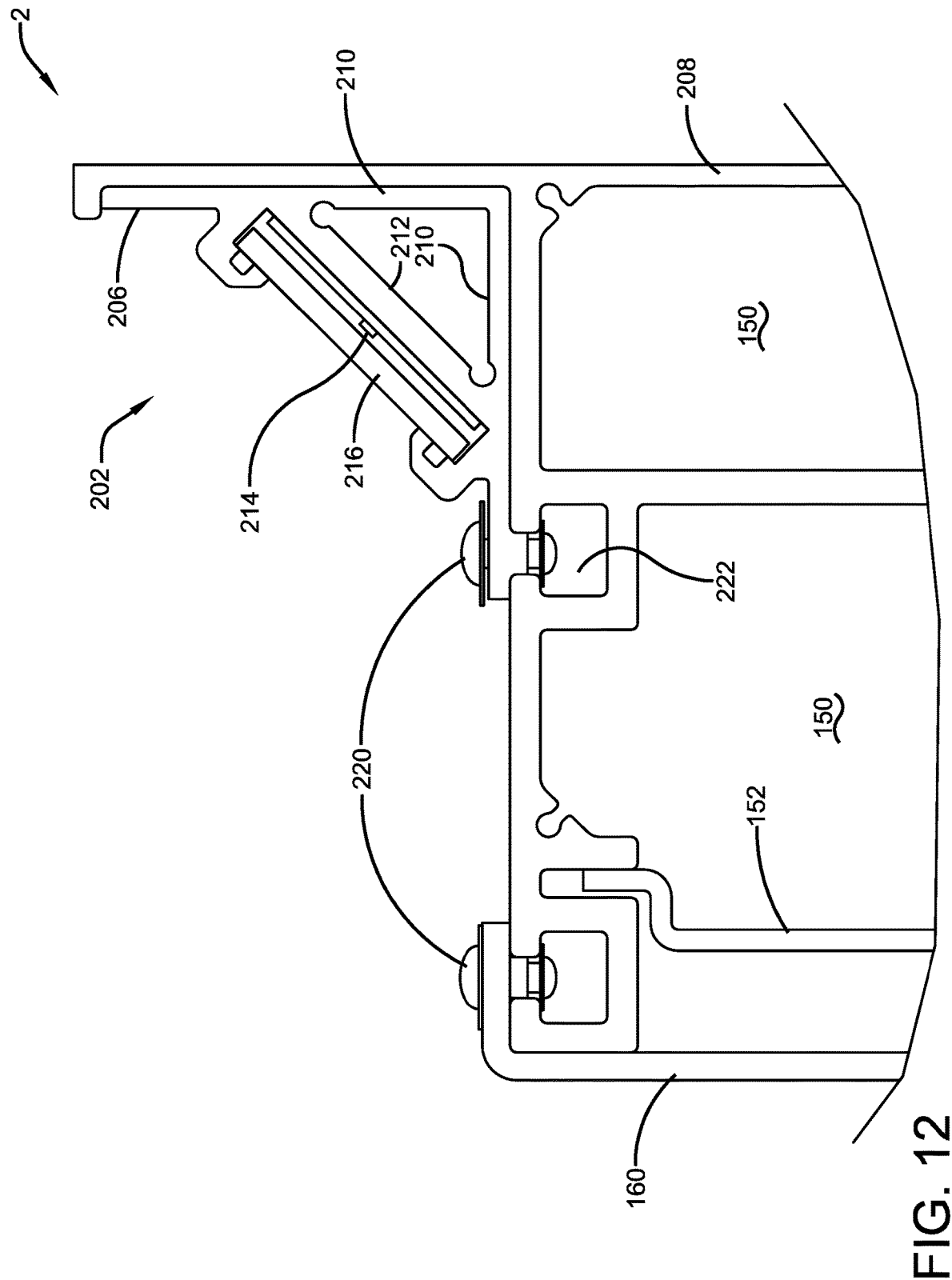
FIG. 12 is an enlarged view of the top of the system configuration of FIG. 11.
Figure 13:
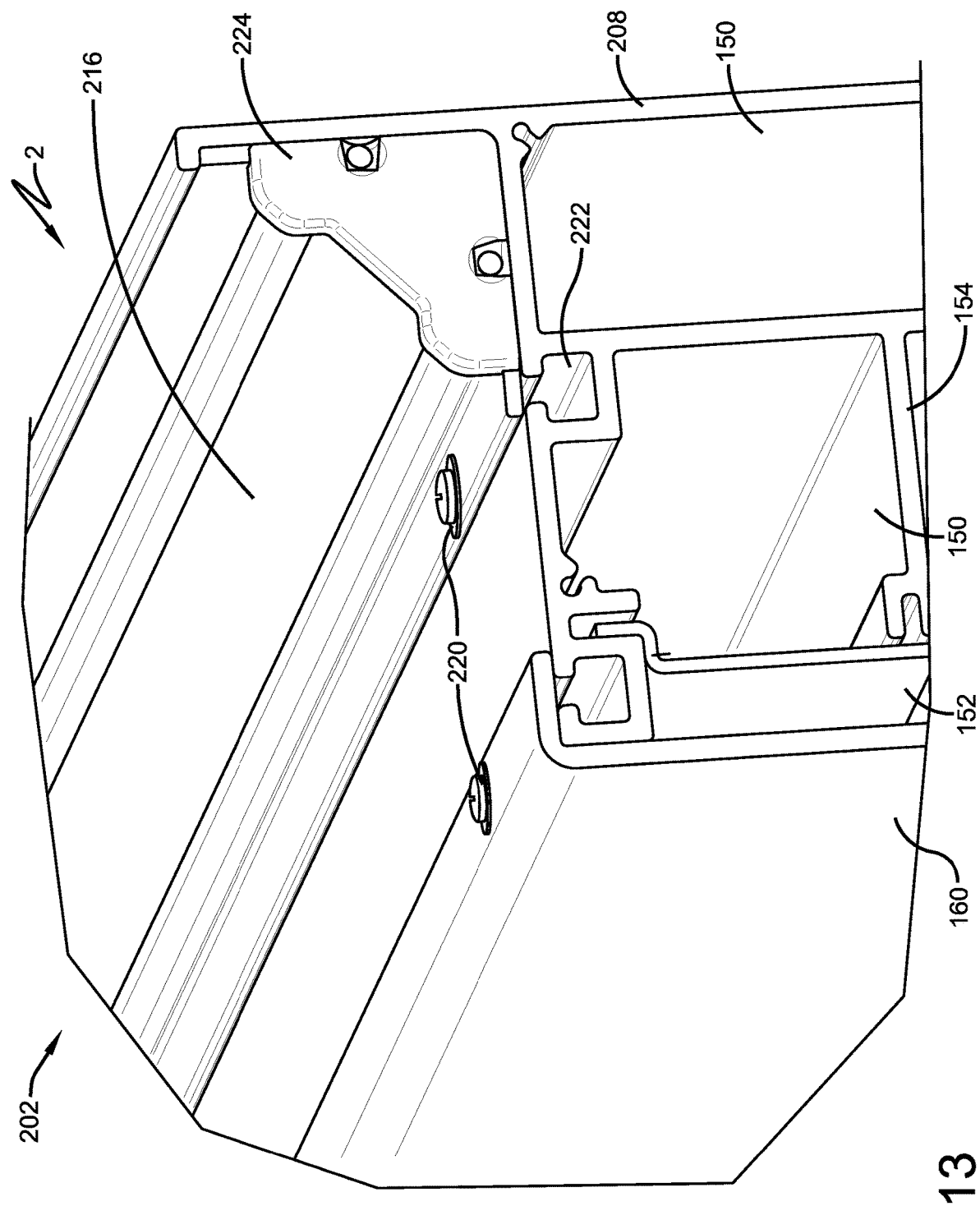
FIG. 13 is a perspective view of FIG. 12.
Figure 14:
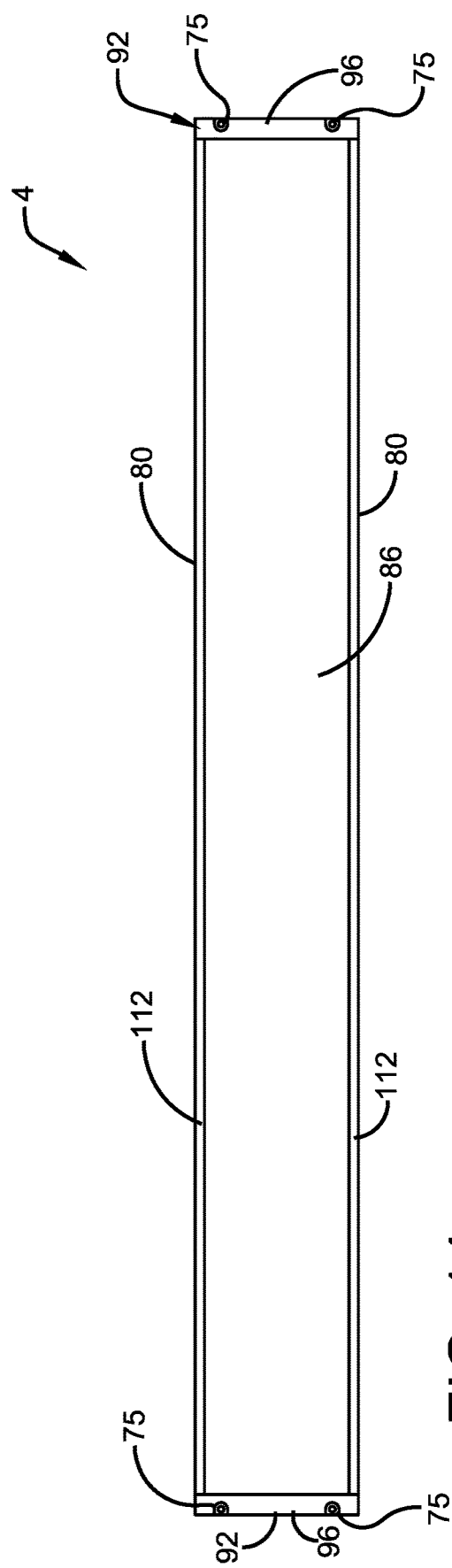
FIG. 14 is a bottom plan view of an exemplary embodiment of a light engine.
Figure 15:
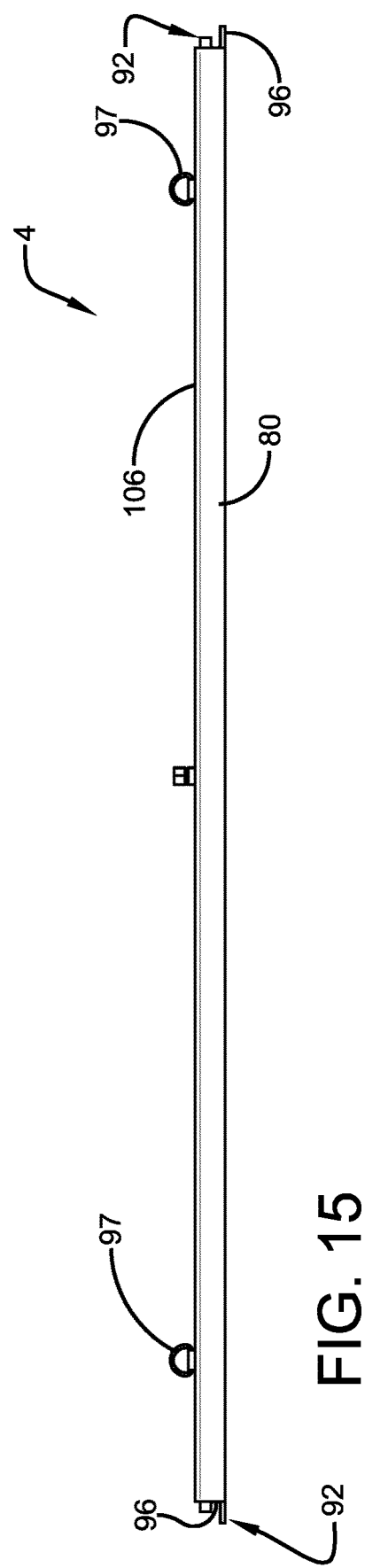
FIG. 15 is a side elevation view of the light engine of FIG. 14.
Figure 16:
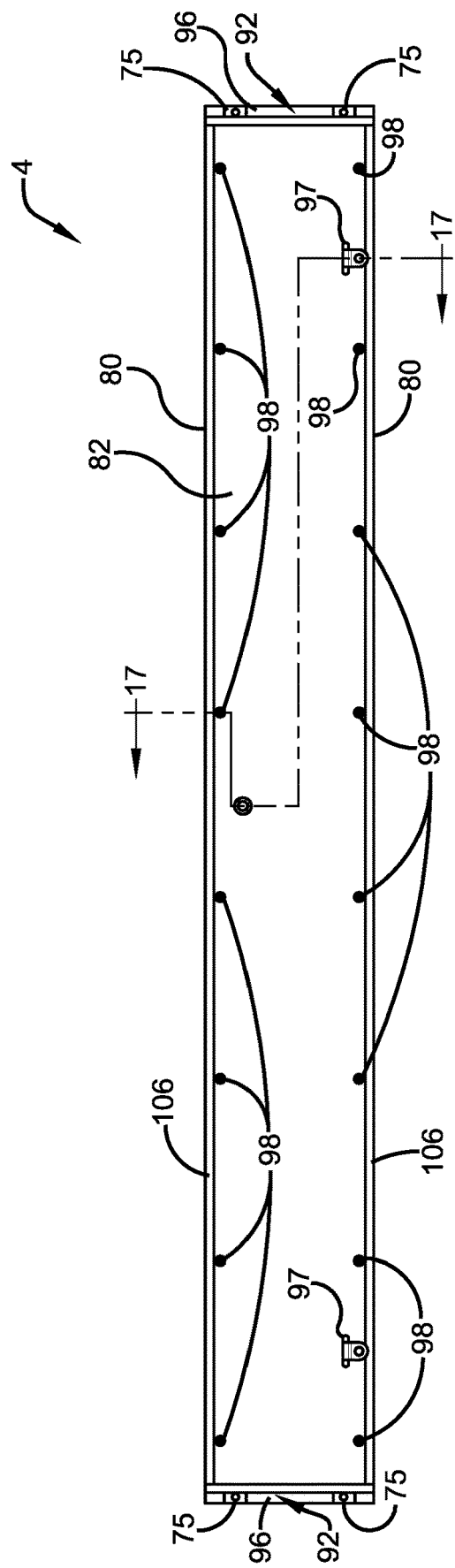
FIG. 16 is a top plan view of the light engine of FIG. 14.
Figure 17:
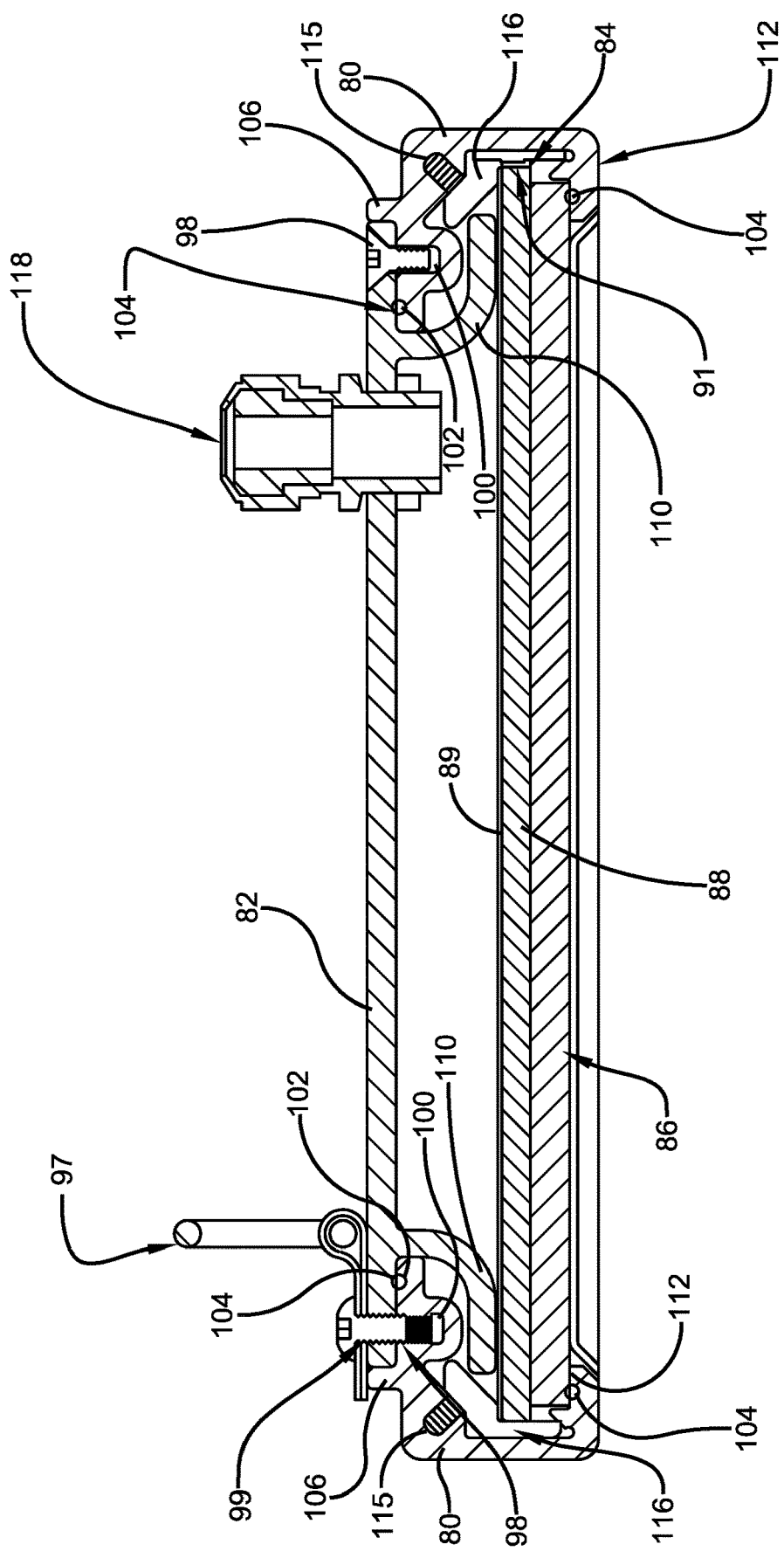
FIG. 17 is a section view taken along line 17-17 of FIG. 16.

FIGS. 11-13 depict a configuration for system 2 that is mounted to a vertical wall 200. This configuration can be configured to provide up lighting from an upper light engine 202, down lighting from a lower light engine 204, or both.

Each light engine 202 and 204 are mounting to a mounting assembly 206 that is carried by a wireway 208. Mounting assembly 206 has a perpendicular base walls 210 and an LED support wall 212 that can be disposed at a forty-five degree angle between walls 210. Each light engine 202 and 204 includes a LED light strip or LED light board 214 disposed behind a diffuser 216. In the configuration of FIGS. 11-13, these are disposed to be direct lit and in other configurations they can be edge lit as described above.

Mounting assembly 206 is seated in a corner of wireway 208 and secured with a quarter-turn fastener 220 that extends into a mounting slot 222 defined by wireway 208. End caps 224 close the ends of the body of mounting assembly 206. Lower light engine 204 is disposed in a corner spaced from wall 200 defined by a lower wall 222 of wireway and a downwardly projecting flange 224 that helps to hide lower light engine from view.

The power supply 120 for LED light board 214 can be carried within the body of mounting assembly 206 when it is large enough or can be carried within a wire channel 150 of wireway 208. In this configuration, wireway 208 defines three wire channels 150 that are individually closed and sealed with doors 152 as described above. These wire channels 150 can be used as described above. The power lines and communication lines can be delivered through wall 200 into channel 150 through the back wall of wireway 208. A common cover plate 160 is provided to give system 2 a pleasing appearance. Another quarter-turn fastener 220 can be used to hold cover plate 160 closed.

These configurations of system 2 can be aligned end-to-end to provide lighting along a long elongated area such as a hallway, subway platform, or the like. During an emergency situation when regular power fails, each light engine can be provided with backup power from a secondary or third power source which can be the high voltage power used to operate trains. When all regular power fails, a battery backup system is provided to power lights. This battery backup power can be supplied to a fraction of the light units such as every other unit or every fifth unit. However, when each system includes three light engines, providing power to every fifth light unit will cause some systems to be skipped. An alternative is to provide battery backup emergency power to all light units at a reduced rate for lower brightness. In this configuration, the emergency power is supplied to all light engines so that all lights stay on but at a brightness that is dimmer than usual.

Exemplary embodiments of specific configurations are provided herein. Features, arrangements, components, and functions may be interchanged between embodiments, such that any component, arrangement, or function may be integrated, subdivided, duplicated, added, removed, or otherwise combined or rearranged with any other embodiment described herein.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A light engine comprising:
    first and second sidewalls; each of the sidewalls having an upper inwardly-disposed projection and a lower inwardly-disposed projection;
    a diffuser assembly having an upper surface and a lower surface; the diffuser assembly disposed above the lower inwardly-disposed projections;
    a top plate connected to the upper inwardly-disposed projections of the first and second sidewalls;
    a pair of flanges extending from the top plate; each of the flanges extending from the top plate to a location disposed under one of the upper inwardly disposed projections;
    each of the flanges engaging the diffuser assembly; and
    wherein each of the flanges resiliently engages the diffuser assembly to impart a force that holds the diffuser assembly against the lower inwardly-disposed projections.

2. The light engine of claim 1, further comprising a seal disposed between the diffuser assembly and each lower inwardly-disposed projection.

3. The light engine of claim 2, further comprising a seal disposed between the top plate and each upper inwardly-disposed projection.

4. The light engine of claim 3, wherein each seal disposed between the top plate and the upper inwardly-disposed projection is disposed between fasteners connecting the top plate to the upper inwardly-disposed projection and the connection of the flange to the top plate.

5. The light engine of claim 1, further comprising LEDs disposed to edge light the diffuser assembly.

6. The light engine of claim 1, wherein each sidewall includes an upwardly projecting abutment wall; the top plate being disposed between the abutment walls.

7. The light engine of claim 1, wherein each upper inwardly-disposed projection defines a fastener channel; the top plate being connected to the sidewalls with plurality of fasteners disposed in the fastener channels.

8. The light engine of claim 7, wherein each flange has a portion disposed between one of the fastener channels and one of the lower inwardly-disposed projections.

9. The light engine of claim 1, wherein the diffuser assembly includes a light guide plate.

10. The light engine of claim 9, wherein the diffuser assembly includes a reflector disposed on the light guide plate.

11. The light engine of claim 10, wherein the diffuser assembly includes a cover that engages the lower inwardly-disposed projections.

12. The light engine of claim 1, further comprising first and second end caps that sealingly engage the sidewalls, top plate, and diffuser assembly.

13. A light engine comprising:
    first and second sidewalls; each of the sidewalls having an upper inwardly-disposed projection and a lower inwardly-disposed projection;
    a diffuser assembly having an upper surface and a lower surface; the diffuser assembly disposed above the lower inwardly-disposed projections;
    a top plate connected to the upper inwardly-disposed projections of the first and second sidewalls with a plurality of top plate fasteners;
    a seal disposed between the top plate and each upper inwardly-disposed projection; the top plate fasteners compressing each seal between the top plate and the upper inwardly-disposed projections;
    a pair of flanges extending from the top plate; each of the flanges extending from the top plate to a location disposed under one of the upper inwardly disposed projections;
    each of the flanges resiliently engaging the diffuser assembly to impart a force that holds the diffuser assembly against the lower inwardly-disposed projections; and
    a seal disposed between the diffuser assembly and each lower inwardly-disposed projection.

14. The light engine of claim 13, further comprising LEDs disposed to edge light the diffuser assembly.

15. The light engine of claim 13, wherein each sidewall includes an upwardly projecting abutment wall; the top plate being disposed between the abutment walls.

16. The light engine of claim 13, wherein each upper inwardly-disposed projection defines a fastener channel; the top plate fasteners being disposed in the fastener channels.

17. The light engine of claim 16, wherein each flange has a portion disposed between one of the fastener channels and one of the lower inwardly-disposed projections.

18. The light engine of claim 13, wherein the diffuser assembly includes a light guide plate.

19. The light engine of claim 18, wherein the diffuser assembly includes a reflector disposed on the light guide plate.

* * * * *